Figure 1:
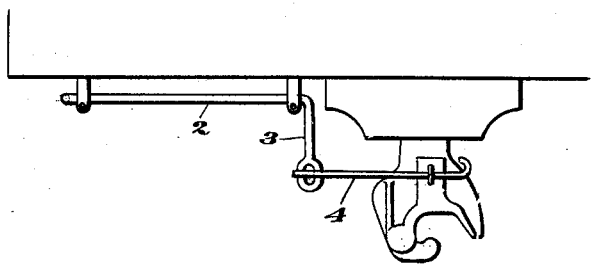

March 11, 1930.  C. L. HOWARD  1,750,308
CAR COUPLER OPERATING DEVICE
Original Filed Aug. 1, 1927  4 Sheets-Sheet 1

Inventor
Charles L Howard

Inventor
Charles L. Howard

March 11, 1930. C. L. HOWARD 1,750,308
CAR COUPLER OPERATING DEVICE
Original Filed Aug. 1, 1927  4 Sheets-Sheet 3

Inventor
Charles L. Howard

March 11 1930. C. L. HOWARD 1,750,308
CAR COUPLER OPERATING DEVICE
Original Filed Aug. 1, 1927   4 Sheets-Sheet 4

Inventor
Charles L. Howard

Patented Mar. 11, 1930

1,750,308

UNITED STATES PATENT OFFICE

CHARLES L. HOWARD, OF CHICAGO, ILLINOIS

CAR-COUPLER-OPERATING DEVICE

Application filed August 1, 1927, Serial No. 209,884. Renewed January 20, 1930.

This invention relates to mechanisms for operating railway car coupler locking pins and consists in an improvement in the connection between the operating member and pin lifting lever and has for its main object to provide a connection which permits the pin lifting lever to swing in a substantially horizontal plane but restricts the relative movement between the operating member and the pin lifting lever in a substantially vertical plane.

Another object is to provide a connection wherein the operating member and the pin lifting lever may be easily assembled but which cannot be disconnected from each other when the device is assembled in operative position on the car.

Another object of the invention is to provide a connection in which removable securing means, such as bolts, nuts, cotter pins, etc., are not required to retain the component parts in proper relative position or which does not comprise loops which may be accidently or maliciously opened to the detriment of the device.

In the drawings:

Figs. 1, 2, 3 and 4 show several types of car coupler operating devices to which my invention is applicable.
Figs. 5, 6, 7 and 8 show one form of the device.

Figs. 9 to 13 inclusive show a modification.

Figure 14:
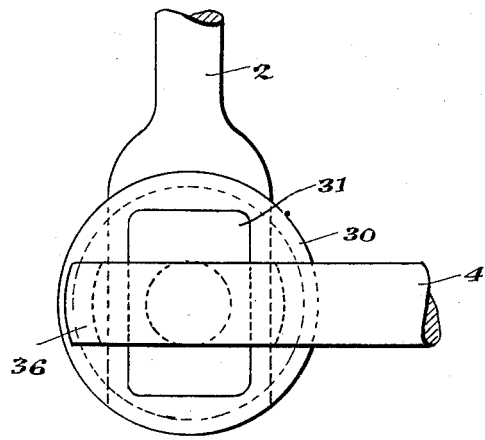
Figures 15, 16:
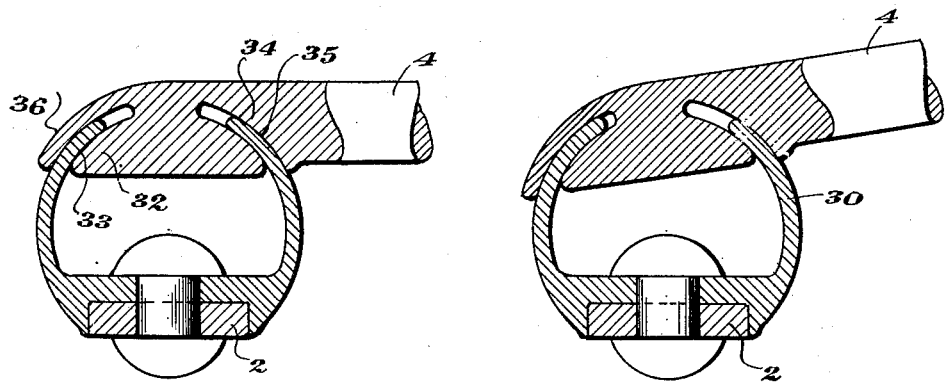

Figs. 14 to 16 inclusive show a further modification.
There are several forms of car coupler operating mechanisms to which my device is applicable; for instance, such types as shown in Figs. 1, 2, 3 and 4, respectively. Fig. 1 shows a device wherein the operating member 2 consists of a rotatable rod mounted on the car and having a depending handle at its outer end and a forwardly projecting crank 3 at its inner end. The pin lifting lever 4 loosely engages the coupler at its inner end and is connected to the operating member by my improved device.

Figure 2:
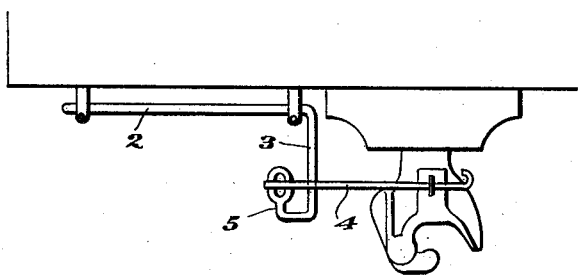

Fig. 2 shows a device wherein the operating member 2 consists of a rotatable rod mounted on the car having a depending handle at its outer end with a crank at its inner end with a return bend 5 at its inner end with the pin lifting lever 4 connected to the operating member by my improved device. The pin lifting lever also rests upon the crank 3 to provide additional support if deemed advisable.

Figure 3:
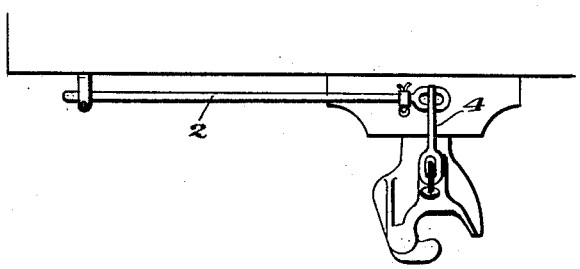

Fig. 3 shows a car coupler operating mechanism wherein the operating member 2 consists of a rotatable rod mounted on the car and having a depending handle at its outer end and the pin lifting lever 4 extending longitudinally of the car with one end operatively connected to the coupler and the other end connected to the operating member by my improved device.

Figure 4:
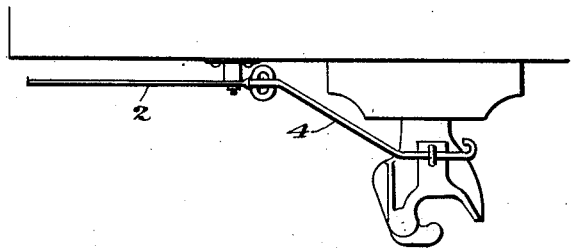

Fig. 4 shows a car coupler operating mechanism wherein the operating member 2 consists of a downwardly movable lever fulcrumed to the car with the pin lifting lever 4 connected to it by my improved device. My improved joint may be positioned at the fulcrum or the operating member may extend beyond the fulcrum and the pin lifting lever connected thereto at its end.

It is understood that the joint or connection which I hereafter describe is not only applicable to the four types of device heretofore described, but also is applicable to other types of car coupler operating mechanisms.

Figure 5:
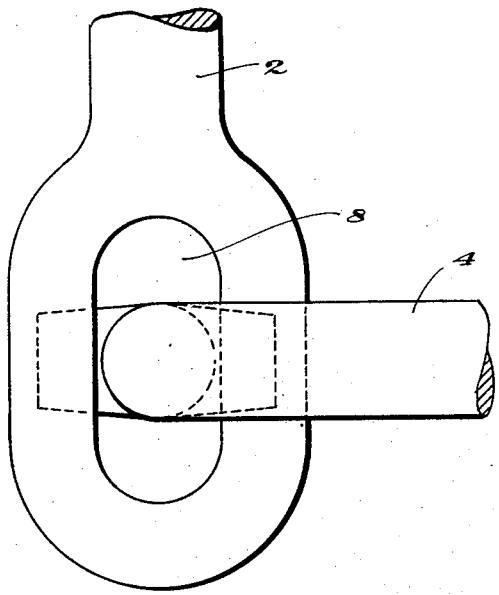
Figure 6:
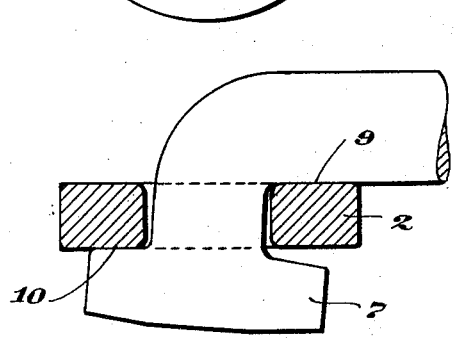
Figure 7:
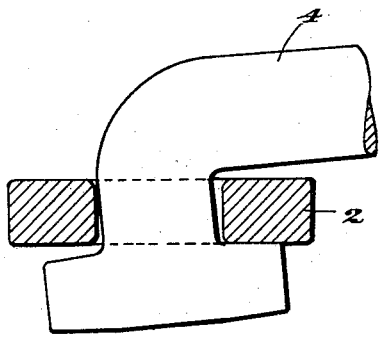
Figure 8:
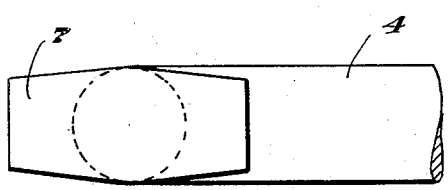
Figure 9:
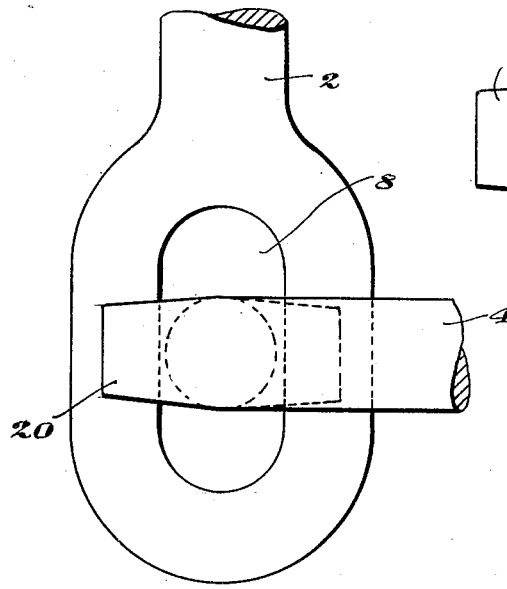
Figure 12:
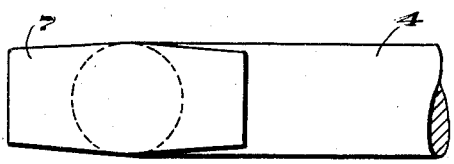
Figure 10:
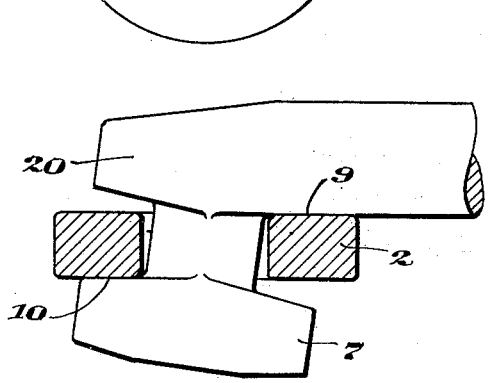
Figure 11:
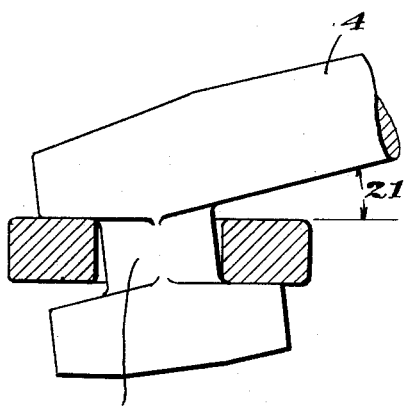

Figs. 5, 6, 7 and 8 show the joint or connection in detail; Fig. 5 showing a plan of the associated parts; Fig. 6 showing an elevation when the device is in normal position and Fig. 7 showing it when the coupler is in "lock set" position. Fig. 8 is a bottom view of the pin lifting lever and its T-head.

To connect the ends of the operating member 2 and the pin lifting lever 4, the T-head 7 is placed in alignment with the slot 8 and inserted therethrough and the pin lifting lever with its T-head is given a right hand turn which makes the connection shown particularly in Fig. 5. The pin lifting lever is then connected to the coupler and the operating member is mounted on the car. When in operative position it will be seen that the pin lifting lever will be permitted to swing in a substantially horizontal plane but will be limited in its movement in a substantially vertical plane on account of the surface 9, of the pin lifting lever and the surface 10 of the T-head 7 coming in contact with the underside of the operating member 2 adjacent the slot 8. The operating member and the pin lifting lever cannot be disconnected from each other while the coupler operating mechanism is mounted on the car. To disengage the lever from the operating member it is only necessary to swing the lever in a position to permit the T-head to be in alignment with the slot and then to withdraw the T-head.

Figs. 9, 10, 11 and 12 are similar to Figs. 5, 6, 7 and 8, respectively, and show a modification wherein a lug or stop 20 is provided to prevent the pin lifting lever 4 from slipping too far through the eye 8 of the operating member 2 in case the angular relation 21 of the parts becomes excessive due to improper application on the car or to the hole 8 or shank 22 becoming worn. Such a condition might cause a binding of the parts.

Figure 13:
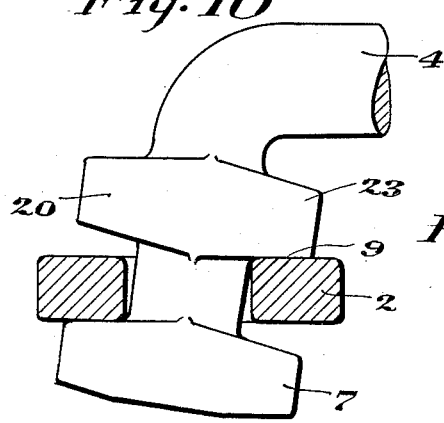

Fig. 13 is added to show that the surface 9 which engages the operating member 2 may be obtained by the addition of a lug 23 or may be a part of the actual pin lifting lever, as shown in Fig. 6.

Figs. 14, 15 and 16 show a modified form wherein the operating member 2 is provided with a semi-spherical housing 30, integral or otherwise, provided with an elongated slot 31 through which the semi-spherical T-head 32 is inserted and positioned so as to engage the inner side thereof (at 33) and a portion 34 of the pin lifting lever 4 engages the outer side thereof (at 35). If desired, a stop 36 may be provided to prevent the pin lifting member from slipping too far through the slotted housing, which stop is preferably semi-spherical to engage the outer side of the housing.

It will be noted that in all forms of my invention an extremely safe and simple connection may be made between the operating member and the pin lifting lever. It will be seen that it is impossible for these two parts to become disengaged while the uncoupling device is on the car and in making this connection such removable securing means as bolts, nuts, cotter pins, etc., are not necessary. And in using a connection in accordance with my invention it will be seen that sufficient horizontal movement of the pin lifting lever is provided for, while at the same time, a limited vertical movement only is permitted.

It is obvious, of course, that in carrying out my invention the T-head 7 may be made a part of the end of the operating member and the slot 8 may be in the end of the pin lifting lever. This is a mere reversal of parts and the operation of the device in this instance is the same as heretofore described.

I claim:

1. In an uncoupling device for car couplers, an operating member, and a substantially horizontal pin lifting member having at one extremity means to support a coupler pin and having at its other extremity a T-head and slot connection with the operating member, which connection permits one member to swing in a substantially horizontal plane but restricts the relative movement at said connection between the members in a substantially vertical plane.

2. In an uncoupling device for car couplers, an operating member, and a substantially horizontal pin lifting member having at one extremity means to support a coupler pin and having at its other extremity a T-head and slot connection with the operating member, which connection permits one member to swing in a substantially horizontal plane but restricts the relative movement at said connection between the members in a substantially vertical plane, the said T-head and slot being relatively positioned so that the members cannot be disconnected from each other when the device is assembled in operative position on the car.

3. In an uncoupling device for car couplers, an operating member, and a substantially horizontal pin lifting member having at one extremity means to support a coupler pin and having at its other extremity a T-head and slot connection with the operating member, said T-head engaging the underside of said operating member adjacent the slot and a portion of the pin lifting lever engaging the upper side of said operating member adjacent the slot, which connection permits one member to swing in a substantially horizontal plane but restricts the relative movement at said connection between the members in a substantially vertical plane.

4. In an uncoupling device for car couplers, an operating member, and a substantially horizontal pin lifting member having at one extremity means to suport a coupler pin and having at its other extremity a T-head and slot connection with the operating member, said T-head engaging the underside of said operating member adjacent the slot and a portion of the pin lifting lever engaging the upper side of said operating member adjacent the slot, which connection permits one member to swing in a substantially horizontal plane but restricts the relative movement at said connection between the members in a substantially vertical plane, the said T-head and slot being relatively positioned so that the members cannot be disconnected from each other when the device is assembled in operative position on the car.

5. In an uncoupling device for car couplers, an operating member, and a substantially horizontal pin lifting member having at one extremity means to support a coupler pin and having at its other extremity a flexible connection with the operating member, which connection permits one member to swing in a substantially horizontal plane but restricts all upward and downward relative movement from normal position at said connection between the members in a substantially vertical plane, said connection being so formed that the members cannot be disconnected from each other when the device is assembled in operative position on the car.

6. In an uncoupling device for car couplers, an operating member, and a substantially horizontal pin lifting member having at one extremity means to support a coupler pin and having at its other extremity a T-head and slot connection with the operating member comprising a semi-spherical slotted housing with the T-head engaging the inside thereof and a portion of the T-head member engaging the outer side thereof, which connection permits one member to swing in a substantially horizontal plane but restricts the relative movement between the members in a substantially vertical plane.

7. In an uncoupling device for car couplers, an operating member, a substantially horizontal pin lifting member having at one extremity means to support a coupler pin and having at its other extremity a T-head and slot connection with the operating member comprising a semi-spherical slotted housing with the T-head engaging the inside thereof and a portion of the T-head member engaging the outer side thereof, which connection permits one member to swing in a substantially horizontal plane but restricts the relative movement between the members in a substantially vertical plane, and a stop to prevent the T-headed member from slipping too far through the slotted member.

CHARLES L. HOWARD.